(12) United States Patent
Wears et al.

(10) Patent No.: US 6,789,784 B2
(45) Date of Patent: Sep. 14, 2004

(54) SEAT RING FOR VALVES

(75) Inventors: William Everett Wears, Marshalltown, IA (US); Lynn Dean Mahncke, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/336,476

(22) Filed: Jan. 3, 2003

(65) Prior Publication Data

US 2004/0129915 A1 Jul. 8, 2004

(51) Int. Cl.[7] .............................................. F16K 25/00
(52) U.S. Cl. ...................................... 251/360; 251/357
(58) Field of Search .................................. 251/356–368

(56) References Cited

U.S. PATENT DOCUMENTS

| | | | |
|---|---|---|---|
| 2,104,419 A | | 1/1938 | Frye |
| 2,192,339 A | * | 3/1940 | Wilson ........................ 251/363 |
| 3,467,357 A | | 9/1969 | Schomer et al. |
| 3,746,305 A | * | 7/1973 | Zakka ......................... 251/360 |
| 4,105,187 A | | 8/1978 | Huber |
| 4,474,208 A | * | 10/1984 | Looney ....................... 251/363 |
| 4,542,879 A | * | 9/1985 | Stein .......................... 251/360 |
| 5,758,682 A | * | 6/1998 | Cain .......................... 251/360 |
| 6,641,112 B2 | * | 11/2003 | Antoff et al. ............... 251/363 |

FOREIGN PATENT DOCUMENTS

| | | |
|---|---|---|
| CH | 320481 | 3/1957 |
| EP | 0750163 A2 | 12/1996 |
| GB | 233850 | 5/1925 |
| GB | 2018397 A | 10/1979 |

OTHER PUBLICATIONS

Sectional and Profile views of 1018S valve product.
Inventor's drawing showing narrow angle detail of prior art valve.
Drawing from Samson website.
Copy of International Search Report for PCT/US03/38765, dated May 30, 2004, 5 pages.

* cited by examiner

Primary Examiner—Paul J. Hirsch
(74) Attorney, Agent, or Firm—Marshall, Gerstein & Borun LLP

(57) ABSTRACT

An improved seat ring, valve body, and seat ring valve assembly have self-aligning characteristics that reduce leakage without the need for an unacceptably high level of assembly torque. The seat ring includes at least one annular thrust bearing surface rim for receiving a valve plug to open and close the valve. The seat ring further includes threads positioned on its exterior surface for mating with threads in the valve body to provide a secondary seal of the seat ring. In order to prevent unacceptable leakage, a point of contact is provided to seat on an angled body contact surface of the valve to form a superior primary contact seal. The seat ring valve assembly reduces torque requirements, properly aligns the seat ring within the cavity, and reduces leakage.

8 Claims, 2 Drawing Sheets

SEAT RING FOR VALVES

BACKGROUND

The present invention relates generally to seat rings and, more specifically, to an improved seat ring and valve assembly having improved alignment features, reduced torque requirements, and reduced leakage.

Conventional globe style control valves and other types of valves commonly include screwed-in or clamped-in seat rings. Seat rings are typically inserted into a cylindrical cavity formed within a valve body of a valve and include an annular thrust-bearing rim for receiving a valve plug to close and open the valve. The seat ring is usually a separate part so it can be replaced. Several economical materials can be used to construct seat rings, including steel, stainless steel, as well as hardened materials such as stellited, ceramic, and Tungsten carbide. The clamped-in seat ring typically requires a compressed gasket to seal the seat ring and prevent fluid leakage. The clamped construction typically requires additional parts and complexity due to the load that is needed in the valve assembly to compress the gasket. Screwed-in seat rings, on the other hand, generally do not require a gasket, but rely on a metal-to-metal sealing surface formed by a line of contact between the seat ring and the valve body. However, conventional screwed-in seat rings suffer certain alignment disadvantages and seal limitations as described below.

FIG. 1 is a cross-sectional view of prior art seat ring valve assembly 10, which includes seat ring 100 screwed into an interior cylindrical sidewall surface 122 of valve body 120. Seat ring 100 includes annular thrust-bearing rim 102, which receives valve plug 160 to open and close the valve. When valve plug 160 is in the closed position the valve plug is compressed against the seat ring 100 and prevents fluid from flowing through the passage 152 created when the valve plug is lifted from the seat ring. The rim 102 further includes exterior cylindrical sidewall 112, which forms a 90 degree angle (from horizontal as shown) and faces interior cylindrical surface 138 of valve body 120 (described in more detail below). Just below the rim 112, a tapered exterior surface, as shown, mates with a tapered surface 136 of the valve body 120. Both tapered surfaces are typically manufactured to be approximately 45 degrees. Together, the tapered surfaces and the sidewalls form the primary sealing surface or line of contact 106 between the parts to form the seal. Below this sealing surface, a threaded portion 104 of the seat ring 100 mates with a threaded portion 110 of valve body 120, which helps secure and guide seat ring 100 into cavity 130. The threaded portion also provides a secondary seal.

The effectiveness of primary line contact seal 106, however, is highly dependent on the alignment (meaning straightness and centeredness) of seat ring 100 within cavity 130. If seat ring 100 is misaligned, a tight uniform circular seal will not occur because certain sections of the seal will have gaps, particularly where there are minute surface flaws in the metal, resulting in unacceptable leakage between seat ring 100 and valve body 120. Unfortunately, conventional screwed-in seat ring assemblies of this type are particularly susceptible to misalignment resulting in leakage for at least three reasons: i) conventional screwed-in seat rings rely on their mated threads to provide alignment and a secondary seal, but given the tolerance between normal industry standard threads, the threads do not provide ample concentricity to achieve consistent shut-off; ii) the sharp edge formed between sidewall surface 112 and angular surface 132 of the rim forms a very narrow line of contact sealing surface during misalignment with valve body surface 136, which is susceptible to minute surface imperfection or irregularities; and iii) the relatively narrow angle (45 degrees) of valve body surface 136 does not sufficiently guide seat ring 100 down into the center of cavity 130, causing seat ring 100 to be susceptible to misalignment. In other words, a misaligned seat ring is particularly susceptible to leakage because it is either not properly centered, not straight, or both, causing at least a portion of the seal to be susceptible to leakage where there is insufficient contact between the opposing angles. To compensate for these limitations and to reduce leakage to an acceptable level, the assembler must apply an unacceptably high level of torque to seat ring 100 to excessively compress seat ring 100 within cavity 130. The required excessive compression creates a complicated assembly process, causes torque stress on the assembly parts, and contributes to a high failure rate of primary seal 106.

What is needed is an improved seat ring valve assembly having self-aligning characteristics for creating a stronger seal with reduced leakage without requiring an unacceptably high level of torque during assembly. Misalignment or lack of concentricity will also effect the ability for the valve plug 160 to seal against the seat ring 100.

SUMMARY

An improved seat ring, valve body, and seat ring valve assembly have self-aligning characteristics that reduce leakage without the need for an unacceptably high level of assembly torque. The improved seat ring is screwed into a cavity formed within a valve body and includes a rim for receiving a valve plug used to open and close the valve. In order to prevent unacceptable leakage, a point of contact is provided by the seat ring to seat into an angled seating surface of the valve body which results in a superior primary contact seal. By providing a point of contact that seats on an angled seating surface, less torque is necessary than is otherwise needed for prior art seat ring valve assemblies. These and other features and advantages can be seen from the following drawings, specification, and claims.

DETAILED DESCRIPTION

Figure 2:
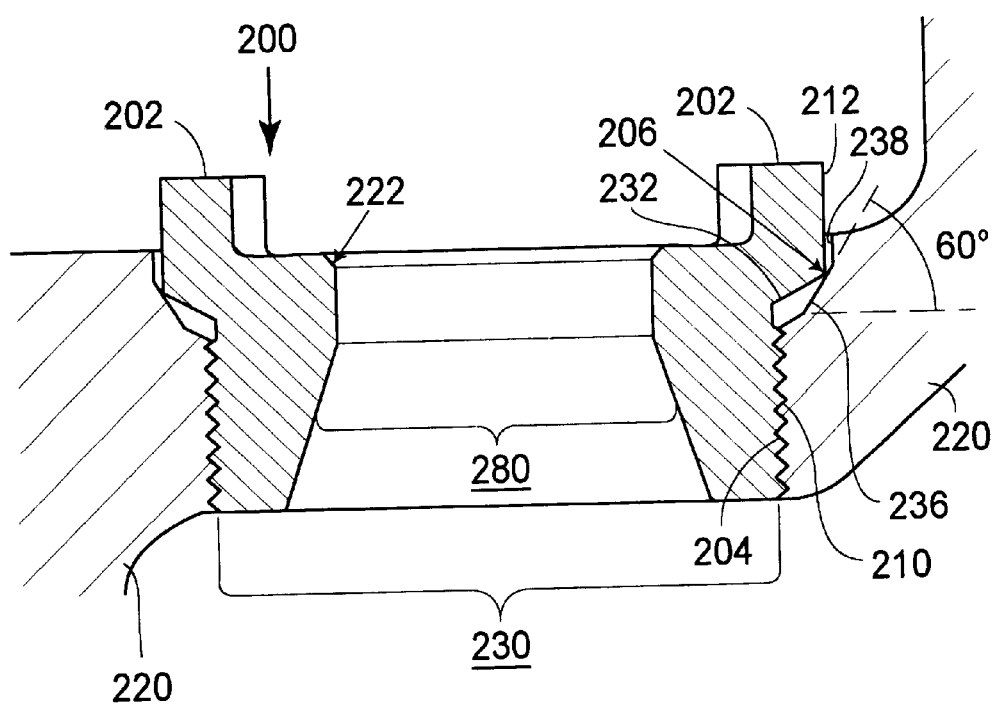
FIG. 2 is a cross-sectional view of an improved seat ring valve assembly in accordance with a first embodiment of the present invention.

Referring now to FIG. 2 a cross-sectional view of a substantially cylindrical seat ring valve assembly is shown. Seat ring 200 has an annular thrust-bearing rim 222 for receiving a valve plug to open and close the valve and a seat ring cavity 280 to allow fluid to flow there through. Seat ring 200 further includes a lug portion 202 and a threaded portion 204 that is used to secure it to the valve body 220 as shown. A special tool (not shown) interfaces with the lug portion to turn the seat ring 200 into or out of the valve body. For convenience, the combination of seat ring 200 and valve body 220 is referred to as a seat ring valve assembly.

Figure 1:
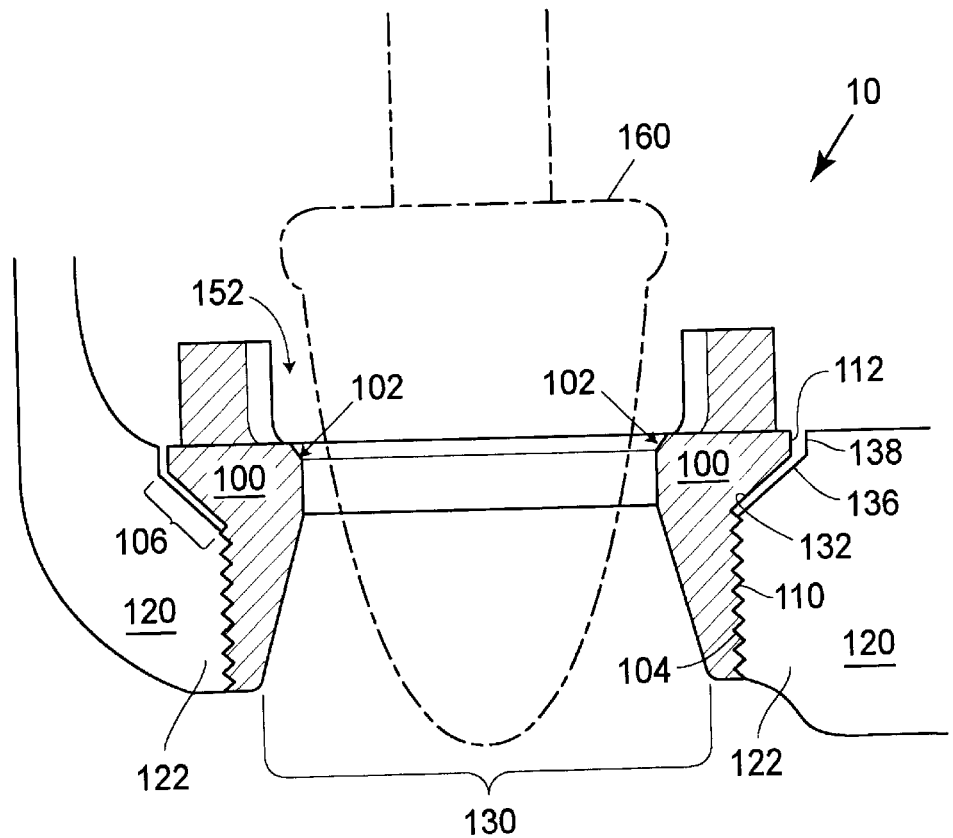
FIG. 1 is a cross-sectional view of a prior art seat ring valve assembly.

In accordance with the present disclosure, rather than a line of contact (item 106 of FIG. 1) as in prior art seat ring valve assemblies; a point of contact 206 is formed between the seat ring 200 and the valve body 220. As shown, the lug portion 202 of the seat ring 200 includes a substantially cylindrical exterior sidewall surface 212, which forms generally a 90 degree angle (from horizontal as shown) and partially faces interior valve body surface 238 of valve body 220. Below the lug portion 202, the seat ring has a tapered surface 232 that is approximately 45 degrees (from horizontal as shown). The junction between the sidewall surface 212 and the tapered surface 232 forms the point of contact 206 that will operate as the primary seal between the seat ring 200 and the valve body 220. Preferably this point of contact is formed to have a radius of approximately 0.03 inches, however other geometries and/or radii may be used. The valve body contact surface 236 is also preferably formed at 60 degrees (from the horizontal as shown), however other angles may be used. For example, angles in the range of 50 degrees to 80 degrees (from the horizon as shown) could be used. The steep angle of the valve contact surface 236 helps to uniformly align seat ring 200 within valve body cavity 230 during assembly by creating a wedging effect that uniformly guides seat ring 200 to a low center point within valve body cavity 230. Once centered the point of contact 206 seats into the surface of the valve body contact surface 236.

As should be appreciated by one skilled in the art, creating the point of contact 206 described above significantly reduces the torque requirements during assembly and avoids compensating for minute flaws in the metal contact surface. Also, the point of contact 206 has another advantage of self-aligning seat ring 200 within cavity 230 during installation by reducing the area needed for alignment to form the seal.

While the invention is susceptible to various modifications and alternative forms, specific embodiments thereof have been shown by way of example in the drawings and as described above. It should be understood, however, that there is no intent to limit the invention to the particular forms disclosed. For example the tapered portion 232 could be other angles or geometries to form the transition from the point of contact to the treaded portion 204. Further, the shape and style of the annular thrust-bearing to accommodate a valve plug may vary depending on the type of valve plug used. Also, in view of the detailed discussion above, one skilled in the art should appreciate that the seat ring valve assembly described below may be incorporated into any conventional valve, such as an on/off valve or globe style control valve. Other modifications should also become apparent in view of the above disclosure without departing from the spirit and scope of the claimed invention.

What is claimed:

1. A seat ring for a valve comprising:
   a rim for receiving a valve plug used to control fluid flowing through the valve;
   a threaded portion for securing the seat ring to the valve; and
   a point of contact having a radius for seating into a valve body contact surface to form a seal.

2. The seat ring according to claim 1, wherein the point of contact is a substantially, spherical surface portion, having the radius.

3. The seat ring according to claim 2, wherein the radius is approximately 0.03 inches.

4. A seat ring valve assembly comprising:
   a valve having a body contact surface for creating a primary seal and a seat ring having:
   a rim for receiving a valve plug used to control fluid flowing through the valve, a threaded portion for securing the seat ring to the valve, and
   a point of contact having a radius for seating into the valve body contact surface to form the primary seal.

5. The seat ring valve assembly according to claim 4, wherein the valve body contact surface of the valve is tapered relative to the direction of the seat ring being threaded into the valve.

6. The seat ring valve assembly according to claim 5, wherein the valve body contract surface of the valve is tapered at an angle between 60 degrees and 80 degrees.

7. The seat ring valve assembly according to claim 5, wherein the valve body contact surface of the valve is tapered at an angle of at least 60 degrees.

8. The seat ring valve assembly according to claim 4, wherein the radius of the point of contract is approximately 0.03 inches.

* * * * *

UNITED STATES PATENT AND TRADEMARK OFFICE
CERTIFICATE OF CORRECTION

PATENT NO. : 6,789,784 B2
DATED : September 14, 2004
INVENTOR(S) : William E. Wears et al.

It is certified that error appears in the above-identified patent and that said Letters Patent is hereby corrected as shown below:

Column 3,
Line 40, please delete "treaded" and insert -- threaded --.

Column 4,
Lines 34 and 40, please delete "contract" and insert -- contact --.

Signed and Sealed this

Eighth Day of February, 2005

JON W. DUDAS
*Director of the United States Patent and Trademark Office*